United States Patent [19]

Egashira et al.

[11] Patent Number: 5,096,201
[45] Date of Patent: Mar. 17, 1992

[54] SOLID GOLF BALL

[75] Inventors: Yoshinori Egashira, Saitama; Kazuyuki Takahashi, Yokohama; Seisuke Tomita, Tokorozawa, all of Japan

[73] Assignee: Bridgestone Corporation, Tokyo, Japan

[21] Appl. No.: 578,977

[22] Filed: Sep. 7, 1990

[30] Foreign Application Priority Data

Sep. 8, 1989 [JP] Japan ................................ 1-233256

[51] Int. Cl.$^5$ ................ A63B 37/00; A63B 37/02; A63B 37/06
[52] U.S. Cl. ................................ 273/218; 273/220; 273/230; 524/908; 525/192; 260/998.14
[58] Field of Search .................. 273/218, 220, 230; 524/908; 260/998.14; 525/192

[56] References Cited

U.S. PATENT DOCUMENTS

| | | | |
|---|---|---|---|
| 4,056,269 | 11/1977 | Pollitt et al. | 273/218 |
| 4,165,877 | 8/1979 | Miller et al. | 260/998.14 |
| 4,561,657 | 12/1985 | Tominaga et al. | 524/908 |

FOREIGN PATENT DOCUMENTS 60-182969  9/1985  Japan .

*Primary Examiner*—Allan M. Lieberman
*Attorney, Agent, or Firm*—Sughrue, Mion, Zinn, Macpeak & Seas

[57] ABSTRACT

One-piece and multi-layered golf balls are improved in flying performance by forming the one-piece ball entirely or multi-layered golf ball core from a rubber composition comprising a base rubber and a co-crosslinking agent in the form of a premix of an unsaturated fatty acid metal salt and a liquid polymer.

15 Claims, 1 Drawing Sheet

SOLID GOLF BALL

This invention relates to solid golf balls having minimal variations in hardness and repulsion and exhibiting improved flying performance.

BACKGROUND OF THE INVENTION

In general, solid golf balls include a one-piece golf ball which is integrally molded in its entirety and a multi-layered golf ball having a core enclosed in a cover with or without one or more intermediate layers. The one-piece golf balls in their entirety and the multi-layered golf ball cores are often manufactured from a rubber composition comprising a rubber component such as polybutadiene, a co-crosslinking agent such as a metal salt of an unsaturated fatty acid, a weight modifier such as zinc oxide, and a radical initiator such as dicumyl peroxide by molding the composition under heat and pressure.

Most rubber compositions use zinc methacrylate or zinc acrylate as the unsaturated fatty acid metal salt for the co-crosslinking agent because higher ball hardness and better repulsion are obtained. The amount of zinc methacrylate or acrylate blended is usually as large as 15 to 60 parts by weight per 100 parts by weight of a rubber component such as polybutadiene. In preparing a rubber composition by milling the respective ingredients, which are usually available in fine powder form, several problems arise including scattering of powder ingredients, difficulty of milling operation due to adhesion to a mill, especially to rolls, and poor dispersion due to potential agglomeration in the composition. These working defects prevent full utilization of the zinc methacrylate or acrylate blended, resulting in balls having inconsistent hardness and repulsion, sometimes an extremely low hardness.

Therefore, an object of the present invention is to provide a solid golf ball having minimal variations in hardness and repulsion and exhibiting consistent flying performance.

SUMMARY OF THE INVENTION

According to the present invention, there is provided a solid golf ball comprising a rubber composition containing a co-crosslinking agent in the form of a premix of an unsaturated fatty acid metal salt and a liquid polymer.

In one form, the ball is a one-piece golf ball which is entirely formed of the present rubber composition.

In another form, the ball is a multi-layered golf ball comprising a core and a cover enclosing the core, wherein the core is formed of the present rubber composition. The core may be enclosed in the cover directly or through an intermediate layer.

According to the present invention, in preparing a rubber composition, an unsaturated fatty acid metal salt such as zinc methacrylate and acrylate is blended in the rubber composition as the co-crosslinking agent in the form a premix with a liquid polymer such as a liquid polybutadiene. The blending of the co-crosslinking agent as a premix with a liquid polymer prevents the co-crosslinking agent from scattering or adhering to a mill, typically rolls during milling of the rubber composition, thereby preventing a reduction of the amount of the co-crosslinking agent dispersed. The pre-mixing also prevents the co-crosslinking agent from agglomerating into masses, allowing for uniform and efficient dispersion.

DETAILED DESCRIPTION OF THE INVENTION

Figure 1:
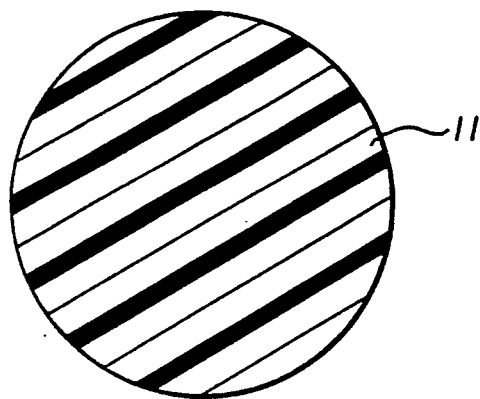
FIG. 1 is a cross section of a one-piece golf ball.
Figure 2:
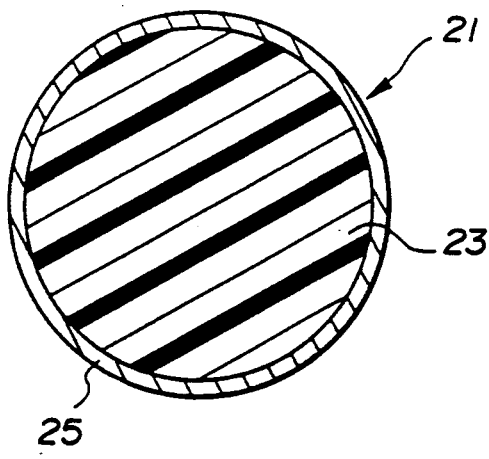
FIG. 2 is a cross section of a two-piece golf ball.

FIG. 1 shows in cross section a one-piece golf ball 11. FIG. 2 shows a two-piece golf ball 21 comprising a core 23 coated with a cover 25. A plurality of, usually 200 to 600, dimples are formed on the surface of the golf balls, although they are not shown in FIGS. 1 and 2.

The solid golf ball of the present invention is a one-piece golf ball or a multi-layered golf ball in which the one-piece golf ball or the core of the multi-layered golf ball is formed from a rubber composition comprising a base rubber and a co-crosslinking agent in the form of a premix of an unsaturated fatty acid metal salt and a liquid polymer.

Examples of the metal salt of unsaturated fatty acid include zinc and magnesium salts of unsaturated fatty acids having 3 to 8 carbon atoms, such as acrylic acid and methacrylic acid. Other suitable unsaturated acids include maleic acid, and fumaric acid with Zinc salts of acrylic and methacrylic acid are most preferred. The unsaturated acid metal salt may take either a completely neutralized form as represented by

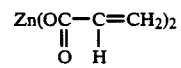

or a partially neutralized form as represented by

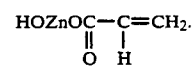

The liquid polymer with which the unsaturated fatty acid metal salt is premixed includes liquid polybutadiene, liquid polyisoprene, liquid butadiene-isoprene copolymers, liquid butadiene-styrene copolymers, liquid polybutene, liquid ethylene-propylene rubber, and the like. The unsaturated fatty acid metal salt may be dispersed in and mixed with the liquid polymer either as a preformed metal salt or by introducing an unsaturated fatty acid and a metal oxide or hydroxide into the liquid polymer and allowing them to react therein to form a metal salt. The unsaturated fatty acid metal salt may be blended in any desired amount, but preferably in amounts of about 30 to about 90% by weight of the premix (liquid polymer plus salt). If a premix containing less than 30% by weight of the metal salt is added to a rubber composition, the composition has a higher fraction of the liquid polymer which can result in a low ball hardness. In excess of 90% by weight, it would become difficult to efficiently mix the metal salt with the liquid polymer. The co-crosslinking premix can be readily prepared by mixing predetermined proportions of the metal salt and the liquid polymer in a kneader or similar milling device.

The premix of an unsaturated fatty acid metal salt and a liquid polymer is added as the co-crosslinking agent to a rubber composition from which one-piece golf balls or multi-layered solid golf ball cores are formed. Preferably, about 30 to about 60 parts by weight of the premix is added to 100 parts by weight of a base rubber in the rubber composition. If the liquid polymer in the premix is a liquid rubber, then its amount should be considered as being included in the amount of the base rubber.

The base rubber used herein may be any desired rubber which is commonly used in conventional one-piece golf balls and cores of multi-layered golf balls. Polybutadiene rubbers, especially poly(1,4-butadiene) rubbers containing at least 40 mol %, preferably 80 to 100 mol % of cis-1,4 bond are preferred because of high rebound resilience, extrusion moldability, and high strength after vulcanization. If desired, the poly(1,4-butadiene) rubbers may be blended with natural rubber, polyisoprene rubber, styrene-butadiene rubber or the like. It is desired that at least 80% by weight of poly(1,4.butadiene) rubber be present in the base rubber because base rubbers containing less amounts of poly(1,4-butadiene) rubber often fail to take advantage of the rebound resilience of polybutadiene rubber.

The rubber composition of the invention may further contain a radical initiator. Preferred examples of the radical initiator include peroxides, such as dicumyl peroxide, t-butylperoxybenzoate, di-t-butylperoxide, 1,1-bis(t-butylperoxy)-3,3,5-trimethylcyclohexane, n-butyl-4,4-bis(t-butylperoxy)valerate, 2,2'-bis(t-butylperoxyisopropyl)benzene, and 2,5-dimethyl-2,5-di(t-butylperoxy)hexane, with the dicumyl peroxide being most preferred. The initiator may be blended in amounts of about 0.3 to about 3 parts by weight, preferably about 0.7 to about 2 parts by weight per 100 parts by weight of the base rubber.

Also employable is a filler. Preferred examples of the filler include metal oxides such as zinc oxide and magnesium oxide. It may be blended in amounts of about 10 to about 80 parts by weight per 100 parts by weight of the base rubber. If desired, the rubber composition can additionally contain a plasticizer, an antioxidant, and any other additives which are generally employed in the preparation of one-piece balls or cores of multi-layered balls. Their amounts may be determined without undue experimentation.

The solid golf ball of the invention may be prepared by milling the ingredients as formulated above by means of a suitable kneading machine such as a roll mill or Banbury mixer and molding the rubber composition into a desired spherical shape, that is, a ball in the case of a one-piece ball or into a core in the case of a multi-layered ball while heating under pressure for vulcanization. The manufacture may be in accord with conventional method and conditions.

When multi-layered golf balls such as two-piece balls are manufactured, the core is coated with a cover. The cover material used herein may be selected from commonly used cover materials, for example, ionomers such as Surlyn ®, polyesters, and nylons. The cover usually has a thickness of 0.5 to 2.5 mm.

The core may be enclosed in the cover directly or through an intermediate layer.

The present invention may be applied to any type of golf ball including small balls having a diameter of at least 41.15 mm and a weight of up to 45.92 g, and large balls having a diameter of at least 42.67 mm and a weight of up to 45.92 g.

The distribution and total number of dimples are not critical although 300 to 550 dimples, preferably 350 to 540 dimples are generally formed on a ball. Preferred dimple arrangements are regular icosahedral, regular dodecahedral, and regular octahedral arrangements. The dimples is preferably distributed uniformly on the ball surface in such an arrangement.

The solid golf balls of the invention are of the above-mentioned construction and exhibit consistent flying performance while maintaining satisfactory hardness and repulsion. The balls can be manufactured without substantial variations in these parameters.

EXAMPLE

Examples of the invention are given below together with comparative examples by way of illustration and not by way of limitation.

Examples 1-6

Two rubber compositions were prepared by mixing the ingredients shown in Table 1 in a Banbury mixer. One-piece golf balls having a diameter of 42 mm were prepared by molding each of the compositions in a mold at 165° C. under pressure for 25 minutes.

TABLE 1

| Ingredients (pbw) | Example | Comparison |
|---|---|---|
| Poly(1,4-butadiene) | 86.7 | 100 |
| Zinc methacrylate | — | 40 |
| Premix* | 53.3 | — |
| Zinc oxide | 10 | 10 |
| Phenolic antioxidant | 0.2 | 0.2 |
| Dicumyl peroxide | 1.1 | 1.1 |

*a premix of liquid polybutadiene and 75% by weight of zinc methacrylate

The balls were examined for hardness and repulsion. The balls of Example showed consistent performance, but the ball of Comparative Example showed variations.

The interior of the Banbury mixer in which the rubber composition was milled was observed to find a substantial deposit of zinc methacrylate on the rotor surface and the inner wall of the mixer for the rubber composition of Comparative Example. Many agglomerates are found in the rubber composition at the end of milling. In contrast, the rubber composition of Example left no deposit in the mixer to ensure smooth and efficient milling operation and appeared uniform at the end of milling.

The balls were tested using a hitting machine of the flywheel type. The balls were hit at a head speed of 50 m/sec. to measure initial velocity. The initial velocity was 69.8 m/sec. for both Example and Comparative Example, indicating that use of a premix of zinc methacrylate with liquid polybutadiene had no adverse effect on flying performance.

Although some preferred embodiments have been described, many modifications and variations may be made thereto in the light of the above teachings. It is therefore to be understood that within the scope of the appended claims, the invention may be practiced otherwise than as specifically described.

We claim:

1. A solid golf ball comprising a rubber composition which comprises 100 parts by weight of a rubber component and about 30 to about 60 parts by weight of a co-crosslinking agent in the form of a premix of a metal salt of an unsaturated acid selected from the group consisting of acrylic acid, methacrylic acid, maleic acid and fumaric acid and a liquid polymer selected from the group consisting of liquid polybutadiene, liquid polyisoprene, liquid butadiene-isoprene copolymer, liquid butadiene-styrene copolymer, liquid polybutene and liquid ethylene-propylene rubber, said metal salt being present in an amount of about 30 to about 90% by weight of the premix.

2. The solid golf ball of claim 1 wherein said unsaturated acid metal salt is zinc methacrylate or acrylate.

3. The solid golf ball of claim 1 wherein said liquid polymer is a liquid polybutadiene.

4. The solid golf ball of claim 1 which is a one-piece golf ball, the ball being formed of said rubber composition.

5. The solid golf ball of any one of claims 1 to 3 which is a multi-layered golf ball comprising a core and a cover enclosing the core, said core being formed of said rubber composition.

6. The solid golf ball of any one of claims 1 to 3 which is a two-piece ball wherein the core is directly enclosed in the cover.

7. The solid golf ball of claim 5 which further includes an intermediate layer disposed between the core and the cover.

8. The solid golf ball of claim 1, wherein the rubber component is a polybutadiene rubber.

9. The solid golf ball of claim 8, wherein said polybutadiene rubber is a poly(1,4-butadiene) rubber.

10. The solid golf ball of claim 9, wherein the polybutadiene rubber contains at least 40 mol % of cis-1,4 bonds.

11. The solid golf ball of claim 10, wherein the polybutadiene rubber contains 80 to 100 mol % of cis-1,4 bonds.

12. The solid golf ball of claim 9, wherein the poly(1,4-butadiene) is blended with natural rubber, polyisoprene rubber or styrene-butadiene rubber.

13. The solid golf ball of claim 12, wherein the rubber component comprises at least 80% by weight of poly(1,4-butadiene) rubber.

14. The solid golf ball of claim 1, wherein said rubber composition further comprises a filler in an amount of about 10 to 80 parts by weight per 100 parts by weight of the rubber component.

15. The solid golf ball of claim 5, wherein the cover has a thickness of 0.5 to 2.5 mm.

* * * * *